Figure 9:
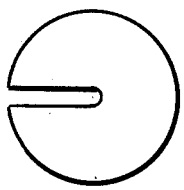

June 15, 1954          W. STELZER          2,681,222
WEIGHING MECHANISM
Filed Aug. 21, 1950          4 Sheets-Sheet 1
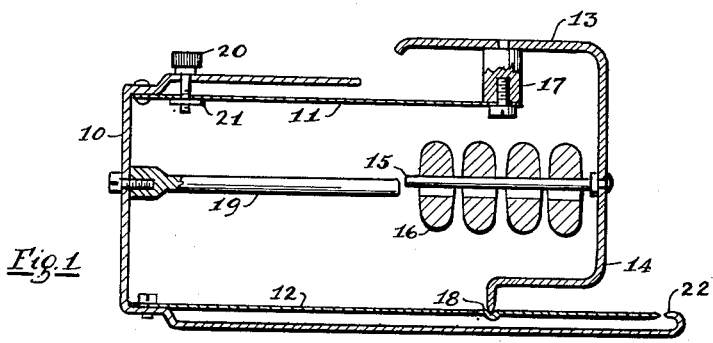
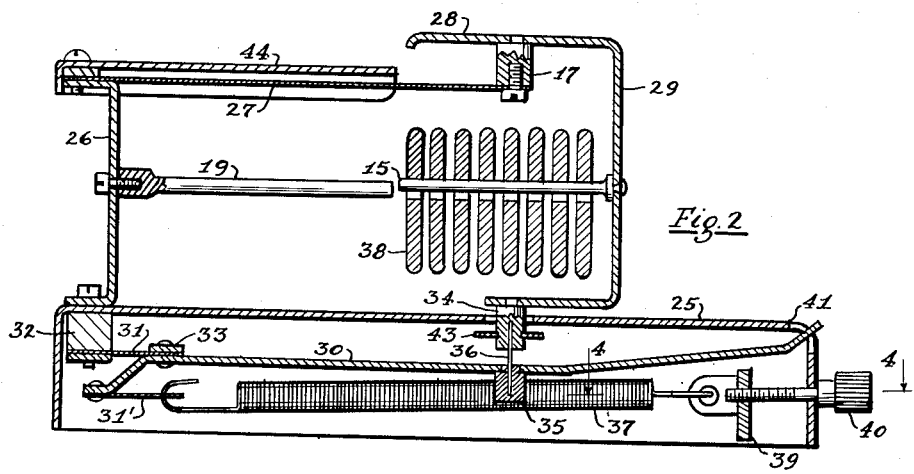
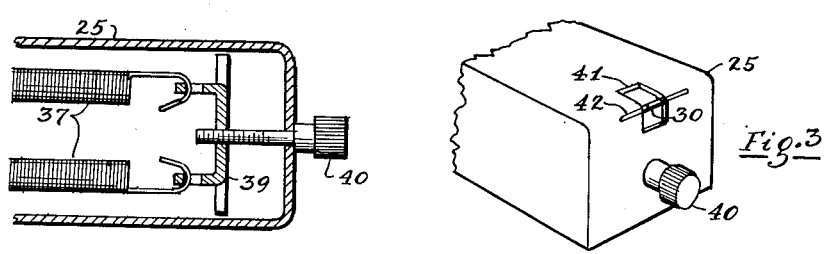
INVENTOR.
William Stelzer

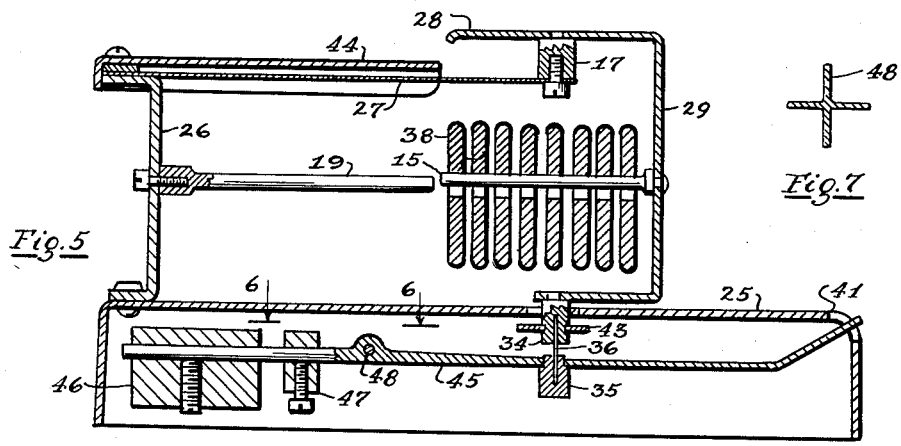
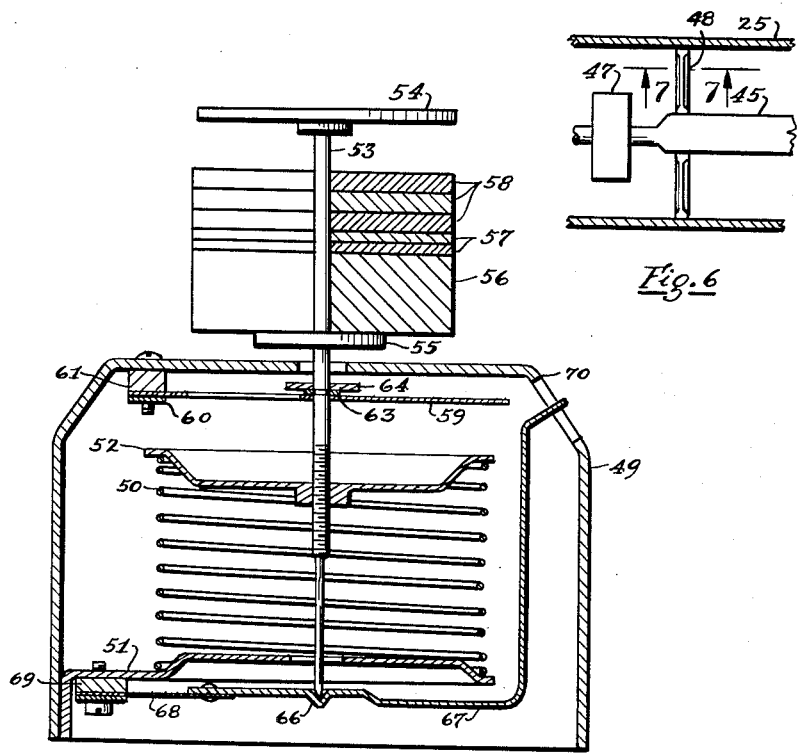

June 15, 1954  W. STELZER  2,681,222
WEIGHING MECHANISM
Filed Aug. 21, 1950  4 Sheets-Sheet 3

INVENTOR.
William Stelzer

June 15, 1954        W. STELZER        2,681,222
WEIGHING MECHANISM
Filed Aug. 21, 1950        4 Sheets-Sheet 4
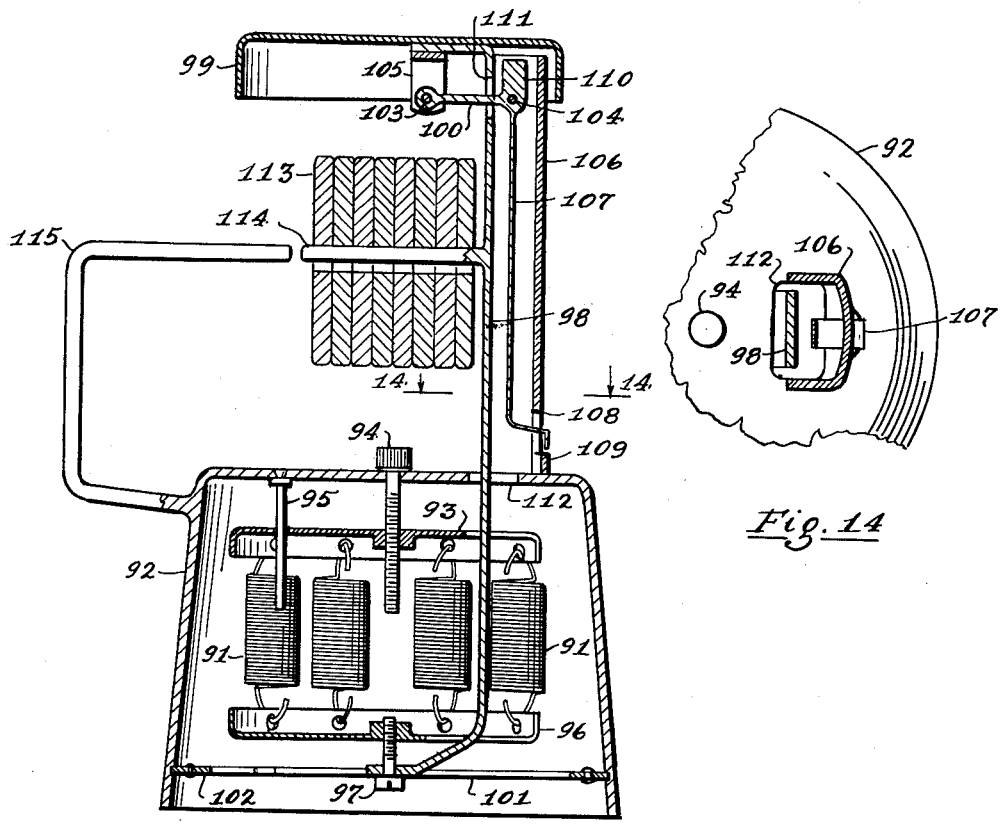
Fig. 14
Fig. 13
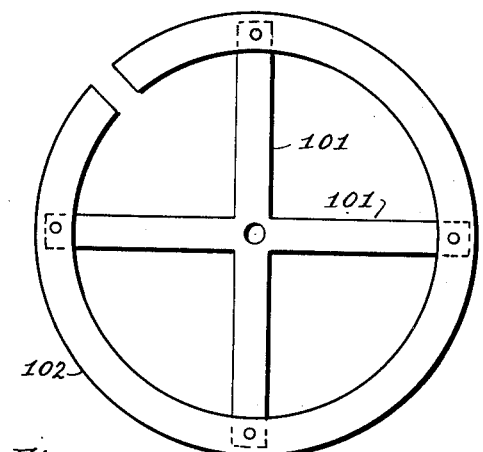
Fig. 15
INVENTOR.
William Stelzer Patented June 15, 1954

2,681,222

UNITED STATES PATENT OFFICE 2,681,222

WEIGHING MECHANISM

William Stelzer, Summit, N. J.

Application August 21, 1950, Serial No. 180,620

6 Claims. (Cl. 265—63)

The invention relates to weighing mechanisms and more particularly to a differential weighing mechanism preferably using springs as a resistant for opposing the load, the latter being complemented with counterweights so that the sum of the load and the counterweights is balanced against the resistant.

Two chief groups of weighing mechanisms as known at present may be recognized, viz: the beam scale and the spring scale, the beam scale employing some form of pivoted lever or cam to reverse the gravitational force of a known weight to oppose the weight of a load. The disadvantage of the beam scale is that the pivots of the lever or cam produce friction and thus affect the accuracy of the scale. Furthermore, the distances between the pivots, or the lever ratio, must be held very accurately. These are faults that are particularly apparent in beam scales of small size, which explains the fact that no small but accurate beam scales are manufactured. Spring scales have the disadvantage of requiring a spring of known force and known rate, whereas mass produced springs vary considerably, so that such scales are usually very inaccurate. In my invention frictional pivots, or at least those of the load carrying type, can be eliminated. While springs are employed as a resistant, they do not need to be accurate, and the accuracy of the weighing device is nearly the same as the accuracy of the weights. Furthermore the device does not have to be on a level surface to give an accurate reading.

The main object, as well as the principle of the invention is to supplement the load to be weighed with complemental or counterweights, the sum representing a constant static load, to balance this constant static load against a known constant force such as produced by a resilient member, and to provide indicating means to show when a balance is obtained.

Another object of the invention is to produce a novel weighing device using known weights, but instead of employing a beam or other pivoted lever means for reversing the gravitational force of the weight, to accomplish this with springs or other resilient means. Contrary to using a graduated dial of the entire range as in present spring scales, the novel invention provides an indicator pointing to an index line and allows only a slight deviation above or below the line to approximately indicate a fraction between the weight units, the principle being to indicate a balanced condition where the sum of the load and the counterweights is constant.

A further object is to eliminate friction in the weighing device by eliminating the beam or lever formerly required, thereby obtaining greater accuracy.

A still further object is to use a spring or springs having a very low rate so that the slightest overweight or underweight of the load is indicated clearly, to give greater sensitivity. This would be impossible in present spring scales unless the dial were made impracticably large.

The invention also aims to provide a weighing device that can be manufactured more cheaply, since the inherent accuracy is obtained without the use of precision parts.

A further aim is to facilitate the addition or removal of counterweights during the weighing operation, whereby the counterweights can be shifted quickly to accelerate the weighing process.

A still further aim is to provide resilient frictionless means to maintain a parallel vertical motion of the load and counterweights irrespective of their position.

The principle of the invention can also be applied to a weighing mechanism including a weight as a resistant. This should not be mistaken as a beam scale because according to my invention the pivot distances need not be held accurately and the pivots may consist of resilient members affecting the opposing force of the resistant but offering no friction.

Figure 10:
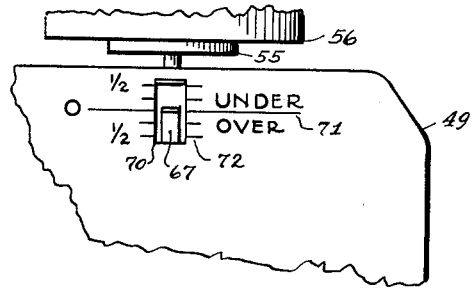
Figure 12:
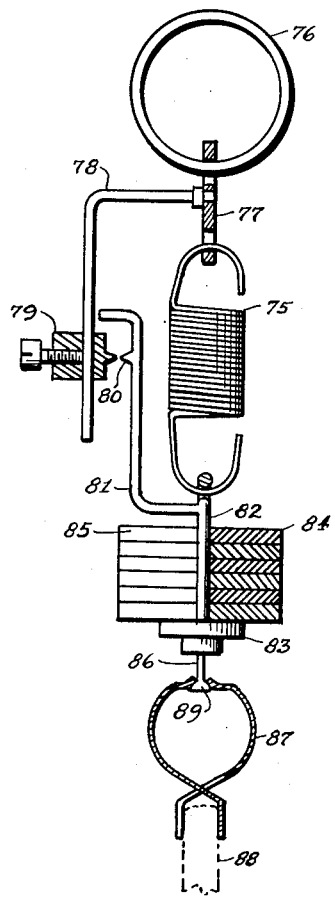
Figure 11:
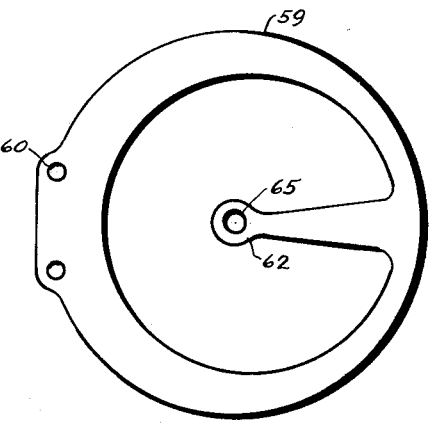

Other objects and advantages will be apparent from the following description considered in connection with the accompanying drawings submitted for the purpose of illustration and not to define the scope of the invention, reference being had for that purpose to the subjoined claims. In the drawings, wherein similar reference characters refer to similar parts throughout the several views:

Fig. 1 is a side elevation, partly in section, of a simplified form of the invention;

Fig. 2, a sectional side elevation of a modified form;

Fig. 3, a perspective view of the front end of the weighing device illustrated in Fig. 2;

Fig. 4, a section taken on line 4—4 of Fig. 2;

Fig. 5, a sectional side elevation of a modification where weights are used as a resistant;

Fig. 6, a sectional plan view taken on line 6—6 of Fig. 5;

Fig. 7, an enlarged section taken on lines 7—7 of Fig. 6;

Fig. 8, a cross-sectional side elevation of a different form of the invention;

Fig. 9, a plan view of the counterweights shown in Fig. 8, drawn to a reduced scale;

Fig. 10, a fragmentary front elevation of the weighing mechanism illustrated in Fig. 8;

Fig. 11, a detail plan view of a guide spring used in Fig. 8;

Fig. 12, a sectional elevation of a weighing device where the principle of the invention is embodied in a tension scale;

Fig. 13, a sectional elevation of a modified form employing a plurality of tension springs;

Fig. 14, a section taken on line 14—14 of Fig. 13; and

Fig. 15, a detail plan view of a guiding device employed in the construction shown in Fig. 13.

Before explaining the present invention in detail it is to be understood that the invention is not limited in its application to the details of construction and arrangement of parts illustrated in the accompanying drawings since the invention is capable of other embodiments and of being practised or carried out in various ways. Also, it is to be understood that the phraseology or terminology employed herein is for the purpose of description and not limitation.

Describing the invention now in detail and referring to Fig. 1, there is shown a small weighing mechanism suitable for weighing letters or other small articles, comprising a stationary frame or support 10 having secured to it leaf springs 11 and 12 supporting a load platform or platter 13 having a leg 14 from which extends a stud or arm 15 carrying complemental weights or counterweights 16 each of which represents a given unit of weight. The upper spring 11 is rigidly secured to a boss extending downwards from platter 13 so that the latter is prevented from turning about a vertical axis. The lower extremity of leg 14 terminates in a pivot point fitting into a socket in spring 12 at 18. The two springs provide a parallel motion so that the velocity at any point of platter 13 is the same and it does not matter where the load is placed. The velocity anywhere along arm 15 is also the same whereby the position of the counterweights has no effect. To afford easy removal of counterweights 16 from arm 15, an arm 19 secured to frame 10 is provided. This arm is in alignment with arm 15 when platter 13 is depressed, where the underside of spring 12 at socket 18 rests against the base of frame 10, so that counterweights 16 can be easily transferred from one arm to the other, which may be compared with the operation of the sliding counters of an abacus. For adjustment of the spring tension an adjusting screw 20 engages a nut 21 on the underside of spring 11, the tension of the latter being adjusted at no load on platter 13 and with all counterweights on arm 15, until the outer end of spring 12 serving as an indicator registers with index point 22 at the end of frame 10. Springs 11 and 12 may be considered as the arms of a parallelogram to provide a parallel motion or the same velocity of members 13, 14 and 15. Such arms should be of equal length, but since both springs are on dead center and the movement is so small the fact that one spring is shorter than the other does not perceptibly affect the parallel motion of the weight carrying members, particularly since the parallel motion is required only when the pointer registers with the index point.

The construction illustrated in Fig. 2 comprises a base or casing 25 carrying a bracket 26 to which is secured a light leaf spring 27 fastened to boss 17 extending from platter 28 whose leg 29 carries arm 15 in alignment with arm 19 extending from bracket 26. The lower portion of leg 29 is guided by an indicator arm 30 pivoted by means of a short flexible leaf spring 31 clamped to casing 25 with a spacer 32 interposed, the leaf spring being also riveted or otherwise secured to indicator 30 at 33. The manner in which leg 29 is connected to indicator arm 30 eliminates any possible friction. Bosses 34 and 35 are secured to leg 29 and indicator arm 30 respectively, and a thin spring wire 36 connects the two. The reason for the necessity of eliminating the friction at this point is that arm 30 not only serves as an indicator, but also transmits the force from tension springs 37 to oppose the gravitational force of counterweights 38 and all members moving therewith. During movement of the latter the wire flexes lightly, the movement being very small. Tension springs 37 are fastened to a thin flexible leaf spring 31' riveted to the end of indicator lever 30 which is bent downwardly so that the springs produce a turning moment about leaf spring 31 to oppose the gravitational force transmitted through wire 36. The opposite ends of springs 37 are fastened to a yoke 39 tapped to receive an adjusting screw 40 with which the tension of the two springs can be adjusted until the indicator end of lever 30 passing through opening 41 registers with index line 42 shown in Fig. 3. It will be noted that springs 37 are slightly inclined; this is to counteract the downward component acting on leaf spring 31 and induced by the weight of the movable members, so that spring 31 is purely in tension and is relieved of carrying any weight. The vertical movement of the movable members is limited to a very short stroke downwardly by the lower horizontal portion of leg 29, and upwardly by a collar or lock ring 43 firmly secured to boss 34. The latter function could also be performed by cover 44 secured over spring 27, but in this embodiment it is merely a protective shield for leaf spring 27. What has been said of leaf springs 11 and 12 in Fig. 1 to produce a parallel motion, also applies to members 27 and 30. They not only restrict the moving parts to a vertical motion of equal velocity, but also prevent lateral motion. To produce the lateral rigidity in members 27, 30 and 31, these parts are wider where they are secured to the stationary supports, and may taper down in width towards the point where they engage the movable parts. The arrangement of tension springs 37 not only permits the use of springs having a low rate, but also multiplies a small movement of the springs to show a considerable stroke of the indicator point at the index. The rate of a helical spring, usually expressed in pounds per inch of deflection, may be reduced by using a larger number of coils of larger diameter and using thinner wire. It is thus a matter of space. In the construction described there is another way in which the rate may be reduced where the deflection per coil is increased for a given increase in load. This is accomplished by extending the end of lever 30 carrying spring or leaf 31 beyond the effective pivotal axis in spring 31. This may be readily understood by considering that the turning moment produced by the springs and acting against the gravitational force via wire 36 depends on the short lever arm extending below spring 31. If the point where leaf 31 is attached is beyond the line where spring 31 flexes, then with a contraction of springs 37 the lever below spring 31 is lengthened to compensate for the reduced force of the springs due to their contraction. While a certain positive rate of the springs is desirable, it may be seen that it could be changed to any degree simply by lengthening the short lever to which leaf 31 is attached.

The modification shown in Fig. 5 is the same in construction as that shown in Fig. 2 except that in place of indicator 30 I use a lever 45, and in place of springs 37 counterpoises 46 and 47 to serve as a resistant. Lever 45 is pivoted on a spring pin 48 whose ends have a cross section as shown in Fig. 7 to permit torsion of the pin in response to a slight rocking motion or oscillation of lever 45. The pin can thus be secured rigidly to lever 45 and at the ends to casing 25 so that no friction is produced. The vertical fins of resilient pin 48 provide vertical rigidity and the lateral fins horizontal rigidity while still permitting a limited rotary motion about the axis of the pin. The length of the lever arm need not be accurate because the counterpoises are adjustable in their positions to produce a turning movement opposing the gravitational force acting on wire 36 to balance when there is no load on platter 28 and all counterweights are on arm 15 or if the weight of the load on platter 28 plus the weight of the counterweights on arm 15 equals the sum of the weights of all counterweights. This embodiment illustrates that the resistant is not limited to resilient means alone.

The modification illustrated in Fig. 8 comprises a casing or base 49 housing a helical spring 50 supported by a bracket 51 extending from casing 49 and engaging a plate 52 whose central boss is tapped to support a threaded rod 53 at the top of which is secured a platter or platform 54 adapted to receive the load to be weighed. An intermediate plate 55 secured to rod 53 supports counterweights 56, 57, and 58 representing different units of weight. 56 might be four ounces, 57 a half ounce, and 58 one ounce, so that the capacity of the weighing mechanism would be one-half pound. Each counterweight has a slot extending from the center outwardly to accommodate rod 53 and to permit easy removal of the counterweights, as shown in Fig. 9. The parallel motion necessary to produce equal velocity of the counterweights and any point of platter 54 is provided by a guide spring 59 secured to base 49 at 60 with a spacer 61 interposed. The central portion 62 of the guide spring, as shown in detail in Fig. 11, engages a lock ring 63 snapped into a small groove in rod 53 to support a washer 64 serving to restrict the upward movement of rod 53. In a downward direction plate 55 serves as a stop so that the movement of rod 53 and platter 54 is very short. The characteristic of spring 59 is that when the central portion 62 is deflected downwardly or upwardly the latter remains in a horizontal plane, or at right angle to rod 53, so that no friction is produced at this point. The lower portion of rod 53 terminates in a point engaging a small socket 66 of an indicator arm 67 riveted to a leaf spring 68 whose other end is secured to bracket 51 with a spacer 69 interposed. Indicator arm 67 is bent upwardly and ends in a slot 70 to register with index line 71 on the outside of base 49. Adjustment is obtained by turning platter 54 which alters the working height of spring 50. Rod 53 thus acts as an adjusting screw. The thread on rod 53 should work freely so that there is no tendency to rotate plate 52 against the resistance offered by spring 50. While the ends of the spring could be secured to plate 52 and bracket 51, this should not be necessary as the friction produced by the spring pressure should be sufficient to prevent plate 52 from turning. In addition to index or zero line 71 there may be a graduated scale 72 indicating fractions of the smallest counterweight, as 57. With such an arrangement, an uneven weight could be determined, and the inaccuracy characteristic of a spring scale would affect only the fraction over or under the weight of the counterweights, the error then being negligible. This feature of course could also be incorporated in the other embodiments described hereinbefore.

To adapt the invention to a tension scale as illustrated in Fig. 12, a tension spring 75 is suspended from a ring 76 and intermediate link 77 carrying an arm 78 on which is an adjustable indicator 79 registering with a pointer 80 at the end of an arm 81 extending from a link 82 hanging on the lower end of spring 75 and having a collar 83 to support counterweights 84 provided with slots 85 extending from the center towards the outside to accommodate link 82. Suspended from collar 83 is a swivel pin 86 to which is joined a spring clamp 87 adapted to support an object to be weighed, indicated by numeral 88. This weighing device when held by ring 76 automatically assumes a vertical position, joint 89 permitting object 88 to align its center of gravity with the vertical axis of the weighing mechanism.

Fig. 13 illustrates how a plurality of light tension springs can be used in a compact design to oppose the gravitational force of the weights and load directly, so that friction is reduced to a minimum and the indicating means become very sensitive, responding to the slightest change in the load. The tension springs 91, being made of this wire and having a great number of coils, are housed within base or casing 92 and suspended from an inverted cup 93 adjustably secured to base 92 by means of an adjusting screw 94. To prevent rotation of cup 93 when the adjusting screw is turned a guide pin 95 attached to base 92 is provided extending through a hole in the cup so as to slide freely. Another cup 96 is arranged underneath and engaging the lower ends of springs 91, the cup being adjustably attached by means of a screw 97 to a vertical connecting member 98 secured to the load carrying platter 99. Platter 99 and member 98 are forced in a fixed vertical path by means of a pivoted link 100 and tensile flexible guide members 101 arranged like the spokes of a wheel, the hub portion being clamped between screw 97 and the lower end of member 98. The outer ends of members 101 are riveted or otherwise secured to an open snap ring 102 held in an internal groove in base 92. Members 101 should be made of thin material and should not be stretched tightly so that a sufficient stroke is possible without putting the material under tension. If the stroke is held short, this construction affords an effective and frictionless guide. It is a particular advantage that guides 101 and link 100 are a considerable distance apart, as the lower end of member 98 moves in a straight vertical line, whereas pivot point 103 moves on an arc about pivot 104; however, the working stroke of platter 99 is so short that the change in horizontal distance between the pivots of link 100 is not noticeable. Link 100 is pivoted at 103 to a yoke 105 extending downwardly from platter 99, and at 104 to the sides of a U-shaped upright post 106 integral with or secured to base 92. Link 100 also serves as an indicator for which purpose it has a downwardly extending pointer 107 whose lower end passes through an opening 108 of said post. An outward bulge 109 in post 106 serves as a fixed point to provide an index line for pointer 107. The pointer should be made as light as possible so that its stabilizing effect on the weighing device is at a minimum. For the same reason I provide a counterweight 110 above pivot 104. If the counterweight is sufficiently large, it not only counteracts the stabilizing effect of pointer 107, but also further reduces the stability of the weighing device as a whole as though the rate of the springs had been reduced to give a greater inclination of the pointer with a given change in load. It should also be considered that counterweight 110 could be increased to such an extent as to provide outright lability where the pointer would never settle on the index line but either show overweight or underweight. Member 98 is provided with a clearance hole 111 to accommodate link 100. Another clearance hole 112 in base 92 permits the passage of member 98, and for the same purpose part of cups 93 and 96 is cut away. The supplemental weights or counterweights 113 are carried by an arm 114 extending from member 98 while stationary arm 115 is secured to base 92 and serves to receive the weights removed from arm 114.

The operation of the mechanisms described is very simple, and the method is the same for all embodiments. Referring, by example, to Fig. 2, before the load is placed on platter 28, with all counterweights on arm 15, the spring tension is adjusted by means of adjusting screw 40 until the pointer of indicator 30 is in alignment with index line 42. The load is then placed on platter 28 and counterweights are removed from arm 15 to arm 19 until the indicator rises towards index line 42. In the case of a postal scale counterweights would be removed from arm 15 until the indicator point is on or above index line 42. The number of weights on arm 19 would then indicate the payable weight of the load weighed. It is of course obvious that the weighing mechanism does not have to be adjusted before every weighing operation, but it should be checked from time to time, particularly after a change of temperature occurs. The deviation of the pointer or indicator from index line 42 gives an approximate indication of the fraction above or below the standard unit of weight as represented by counterweights 38 and in the device shown in Fig. 2 it is illustrated how a scale may be used to read such a fraction.

In another aspect of the operation of the weighing device it may be considered that the load is placed on the platter, and then counterweights are placed on arm 15 to complement the load to produce a definite total weight opposed by the spring force which is held within a fixed small range and for practical purposes may be considered as a definite force. The difference between the total weight of the counterweights necessary to counterpoise the spring force at no load and the weight of the counterweights on arm 15 to complement the load then being equal to the load on platter 28.

I claim:

1. A weighing mechanism comprising means arranged to move vertically a minimum perceptible distance and having a platter to support a load to be weighed, a weight carrying member secured to said means, complemental weights of known weight adapted to be placed on said weight carrying member, a resilient resistant adjusted to produce a definite upward force in one position in opposition to the gravitational force acting on said means, a base, a pair of parallel horizontal arms spaced one above the other and having one end connected to said means and the other end connected to said base, one of said horizontal arms being rigid and connected to said base by a flexible band, the other of said horizontal arms being a flat horizontal leaf spring of a shape where said end connected to said means is restricted to move vertically and colinearly with said one end of said one horizontal arm, and indicating means adapted to indicate a balance between said gravitational force and said opposing force of said resistant, where the weight of a known load placed on said means to balance said opposing force without counterweights minus the weight of said counterweights placed on said means to produce a balance represents the weight of any load placed on said means.

2. A weighing mechanism comprising carrying means arranged to move vertically and to support a load to be weighed, a predetermined number of removable counterweights placed on said carrying member to increase the gravitational force, a resilient resistant proportioned to oppose and counterbalance said gravitational force with a total amount of counterweights on said carrying member and no load, indicating means to indicate a balance between said gravitational force and the opposing force of said resistant, a graduated scale arranged in cooperation with said indicating means to measure increments of weight smaller than the weight of one of said counterweights and deviating from where an exact balance would be indicated, and adjusting means operated by manipulation of said carrying member to adjust said indicating means.

3. A weighing mechanism comprising a load carrying member to support a load to be weighed, a pair of superposed spaced horizontal and parallel arms fixed at one end and connected to said load carrying member at the other to restrict said load carrying member to a short vertical movement where all points of said member have equal velocity, a predetermined number of removable counterweights of known weight adapted to be attached to said load carrying member to increase the gravitational force, a resistant proportioned to oppose and counterbalance said gravitational force with a total amount of counterweights on said member and no load, and means to indicate a balance between said gravitational force and the opposing force of said resistant, said load carrying member comprising an adjusting screw integral with said load carrying member and operated by rotation of said load carrying member to adjust said means to indicate a balance.

4. A weighing mechanism comprising a load carrying member arranged to move vertically to support a load to be weighed, a predetermined number of counterweights of known weight adapted to be attached to said load carrying member to increase the gravitational force, a resistant comprising a helical compression spring directly under said load carrying member to oppose said gravitational force to produce a balance when the weight of the load plus the weight of the counterweights attached to said member are equal to the weight of the total number of said counterweights, means to restrict the movement of said load carrying member to a limited vertical path where all points of said member have equal velocity, indicating means to indicate a balance between said gravitational force and the opposing force of said resistant, and manually operable means integral with said load carrying member and adapted to be operated by rotation of the latter to adjust the force of said spring.

5. A weighing mechanism comprising a load carrying member arranged to move vertically and having a platter at the top to carry a load to be weighed, weight carrying means secured to said load carrying member to move therewith, a predetermined number of counterweights of known weight adapted to be placed on said weight carrying means to increase the gravitational force acting on said load carrying member, a resilient resistant acting upwardly directly on said load carrying member to oppose said gravitational force to produce a balance when the weight of the load plus the weight of the counterweights placed on said weight carrying member are equal to the weight of the total number of said counterweights, means to restrict the movement of said load carrying member to a limited vertical path where all points of said member as well as the load and said counterweights have equal velocity, indicating means to indicate a balance between said gravitational force and the opposing force of said resistant, and manually operable means to adjust the force of said resistant, said last named means comprising an adjusting screw integral therewith and rotatable by rotation of said load carrying member and cooperatively connected with means for transmitting said upwardly acting force of said resistant to said load carrying member.

6. A weighing mechanism comprising a hollow base, a vertically movable member consisting of a central rod, a platter secured at the top of said rod to carry a load to be weighed, weight supporting means secured to said rod below said platter, a predetermined number of removable counterweights of known weight on said weight supporting means to increase the gravitational force acting on said vertically movable member, a resistant consisting of a helical compression spring supported in said base and acting upwardly against said vertically movable member to oppose said gravitational force to produce a balance when the weight of the load plus the weight of the counterweights placed on said weight supporting means are equal to the weight of the total number of said counterweights, parallel spaced horizontal arms flexibly pivoted at one end to said base and at the other to said vertically movable member to limit the latter to a short vertical movement where the velocities of all points of said movable member as well as said load and said counterweights are the same, one of said arms being extended to serve as an indicator, means to limit the vertical movement of said movable member, said central rod having a threaded portion, and a member engaging said threaded portion and the upper part of said helical compression spring, whereby adjustment of the force of said spring is obtained by rotating said platter and said central rod.

References Cited in the file of this patent

UNITED STATES PATENTS

| Number | Name | Date |
|---|---|---|
| 1,594,536 | Ludlow | Aug. 3, 1926 |
| 1,682,506 | Hansen | Aug. 28, 1928 |
| 2,381,086 | Steele | Aug. 7, 1945 |

FOREIGN PATENTS

| Number | Country | Date |
|---|---|---|
| 6,093 | Germany | July 9, 1879 |
| 16,769 | Germany | Jan. 31, 1882 |
| 6,586 | Germany | May 30, 1885 |
| 604,201 | Great Britain | June 30, 1948 |